(12) United States Patent
Kobusch

(10) Patent No.: US 7,282,714 B2
(45) Date of Patent: Oct. 16, 2007

(54) MOLDABLE AND CURING REFLECTOR MATERIAL WITH HIGH REFLECTIVITY

(75) Inventor: Manfred Kobusch, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/493,898

(22) Filed: Jul. 27, 2006

(65) Prior Publication Data

US 2007/0023666 A1     Feb. 1, 2007

(30) Foreign Application Priority Data

Jul. 28, 2005   (DE) .................... 10 2005 035 421

(51) Int. Cl.
*G01T 1/20* (2006.01)
(52) U.S. Cl. .................................................... 250/368
(58) Field of Classification Search ................. 250/368
See application file for complete search history.

(56) References Cited

U.S. PATENT DOCUMENTS

| 4,533,489 A | 8/1985 | Utts et al. |
| 4,543,485 A | 9/1985 | Ishii et al. |
| 5,061,855 A | 10/1991 | Ryuo et al. |
| 6,245,184 B1 | 6/2001 | Riedner et al. |
| 2005/0167605 A1* | 8/2005 | Juni ...................... 250/370.11 |

FOREIGN PATENT DOCUMENTS

EP      0 146 255 A2     6/1985

OTHER PUBLICATIONS

German Office Action for corresponding case, Mar. 6, 2006.

* cited by examiner

*Primary Examiner*—David Porta
*Assistant Examiner*—Mark R Gaworecki
(74) *Attorney, Agent, or Firm*—Harness, Dickey & Pierce, P.L.C.

(57) ABSTRACT

A moldable and curing reflector material for an X-ray detector is disclosed. It includes a detector material which converts X-rays into light and is divided into a plurality of segments separated by the reflector material. The reflector material includes a polymer matrix which contains a first optically reflecting material and also a finely distributed gas and/or a second optically reflecting material, which is different than the first optically reflecting material. An X-ray detector is further disclosed, which contains a material of this type, along with a process for producing a material of this type and a process for producing an X-ray detector.

20 Claims, 2 Drawing Sheets

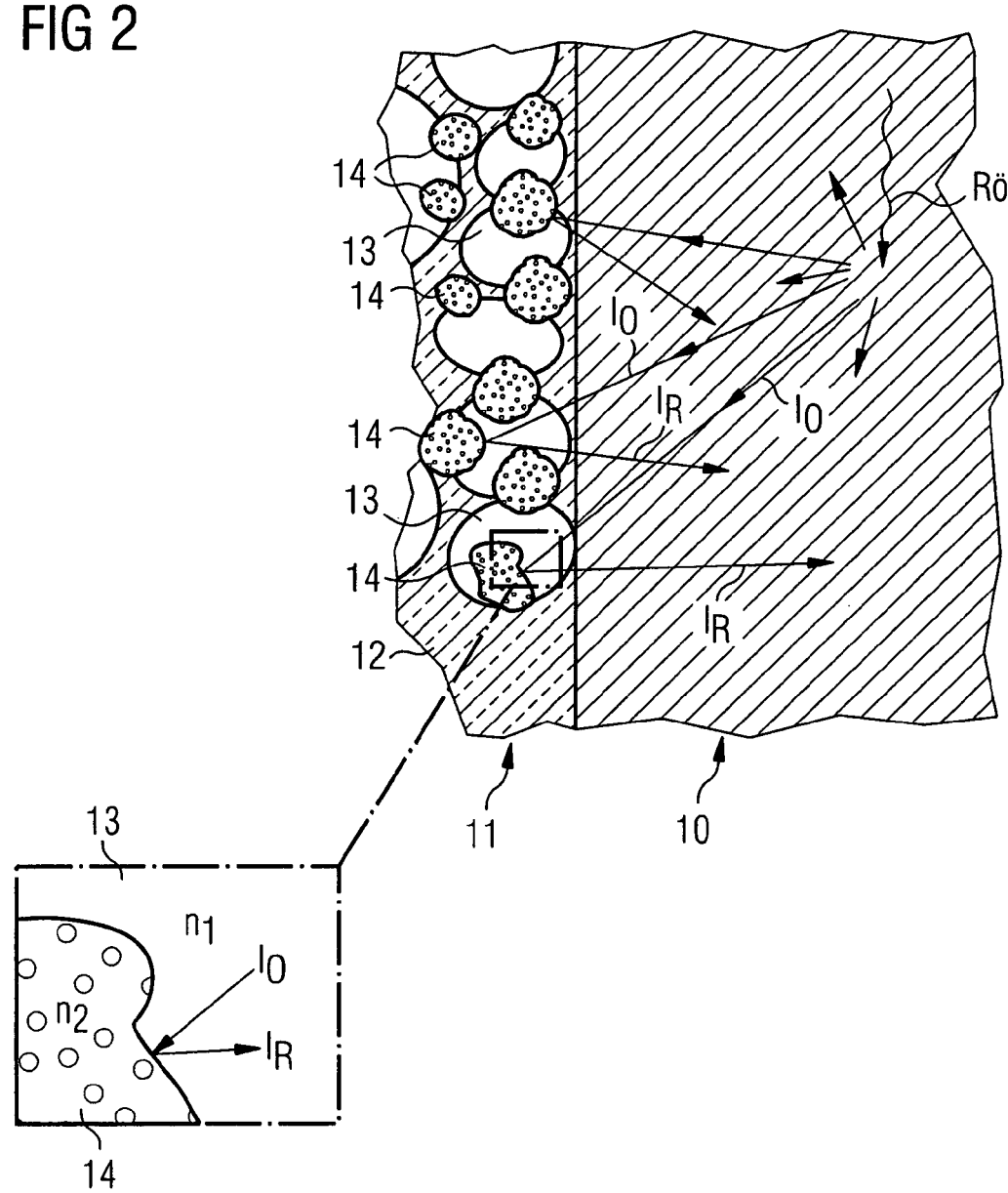

US 7,282,714 B2

MOLDABLE AND CURING REFLECTOR MATERIAL WITH HIGH REFLECTIVITY

PRIORITY STATEMENT

The present application hereby claims priority under 35 U.S.C. §119 on German patent application number DE 10 2005 035 421.1 filed Jul. 28, 2005, the entire contents of which is hereby incorporated herein by reference.

FIELD

The invention generally relates to a moldable and curing reflector material for an X-ray detector. For example, it may relate to one which includes a detector material which converts X-rays into light and is divided into a plurality of segments separated by the reflector material, the reflector material comprising a polymer matrix. The invention also generally relates to an X-ray detector. For example, it may relate to one which contains a material of this type. The invention also generally relates to a process for producing a material and/or to a process for producing an X-ray detector.

BACKGROUND

X-ray detectors which have a gadolinium oxysulfide ceramic (UFC ceramic) as detector material are frequently used in computer tomography (CT). With the aid of this material, X-rays can be converted into visible light. The X-ray image is reconstructed from the electrical signal which is then formed using a linked photodiode.

When constructing these detectors, the detector material is structured by sawing in order in this way to obtain individual, small detector segments which are arranged next to one another and are separated from one another by the sawn grooves. A detector module of this type comprising a plurality of detector segments is linked to a photodiode module, which comprises a photodiode array, with photodiodes arranged next to one another in a suitable manner for the individual detector segments, and a conductor structure for reading the individual photodiode elements. A detector segment together with the associated photodiode element then forms an individual detector channel. The outer surfaces of the detector module which do not face the photodiode module are encased in an optically reflecting layer.

Likewise, the sawn grooves are separated using optically reflecting separating layers, generally referred to as "septa". This ensures that the light which is generated in a detector channel by the impingement of X-ray quanta can be recorded sensitively and individually with the aid of the associated photodiode without radiation losses to the outside or into other channels occurring.

Hitherto, one-dimensionally structured linear detectors have been produced in the manner described. Whereas the outer reflector generally consists of a $TiO_2$-filled epoxy resin (e.g. Araldite 2020®), the reflecting septa of detectors of this type are usually formed from an aluminum foil coated with $TiO_2$-filled polymethyl methacrylate (PMMA). For other structuring operations, $BaSO_4$-filled Hostaphan® sheets are also used for outer reflectors and as septum material.

However, faster CT appliances require detectors which are structured not just in one dimension but rather in two spatial directions, since these detectors allow the direct imaging of anatomical volumes. Hitherto, linear detectors have often been combined to produce a two-dimensional detector structure in matrix form.

For more economical production of new two-dimensionally structured detectors, it would be considerably more favorable for the two-dimensional structure to be produced in the detector material by suitable cross-sawing. However, unlike with one-dimensionally structured detectors, in the case of two-dimensionally structured detectors, it is very difficult if not impossible for the individual detector channels to be optically separated by the introduction of a sheet into the two-dimensional structure. It would therefore be advantageous for the septa to be produced by filling the structuring with a highly reflecting, castable, hardening reflector material.

A suitable moldable, curing material which is as far as possible light-proof and highly reflecting, has not however hitherto been available. The outer reflector material that has been used hitherto and includes a $TiO_2$-filled epoxy resin is not optimally suitable for use as septum material, since the reflectivity is insufficient for a clean separation of the individual detectors. The reflectivity also cannot be improved by further increasing the $TiO_2$ content, since the intrinsic reflection of $TiO_2$ does not increase any further at a filling level above 20-25%. At the same time, higher filling levels, on account of the increase in viscosity of the uncured suspension, have an adverse effect on the penetration into narrow sawn gaps.

SUMMARY

At least one embodiment of the present invention allows a clean separation between individual detector channels, even in the case of two-dimensional structures.

The present inventors have surprisingly discovered that the reflectivity of a reflector material can be increased and its light-proofness can be improved if an additional, finely distributed gas and/or a further optically reflecting material are introduced into the reflector material.

Therefore, at least one embodiment of the present invention provides a moldable and curing reflector material for an X-ray detector, which includes a detector material which converts X-rays into light and is divided into a plurality of segments separated by the reflector material, the reflector material comprising a polymer matrix which contains a first optically reflecting material and also a finely distributed gas and/or a second optically reflecting material, which is different than the first optically reflecting material.

A suitable detector material is in particular the UFC ceramic which has already been described above and which converts X-rays into visible light.

In at least one embodiment, the polymer matrix may be formed by a plastic resin, in particular an epoxy resin or PMMA (polymethyl methacrylate). Plastic resins of this type can be formed from liquid polymer components, which can be uniformly mixed with the further constituents of the reflector material, and then cured in a controlled way after the reflector material has been introduced into an X-ray detector.

The first optically reflecting material in the reflector material according to at least one embodiment of the invention is preferably selected from the group consisting of $TiO_2$, $BaSO_4$, $WO_3$, $Gd_2O_3$, $Sb_2O_3$, $Ta_2O_5$, $La_2O_3$, $SnO$, $BaCO_3$ and mixtures thereof.

If, in addition to the first optically reflecting material, a second optically reflecting material is present, the first optically reflecting material is preferably $TiO_2$, which has already been used in conventional outer reflectors but is not on its own sufficient to achieve the desired high reflectivity.

The second optically reflecting material used may be, for example, a material selected from the group consisting of $BaSO_4$, $WO_3$, $Gd_2O_3$, $Ta_2O_5$, $La_2O_3$, $Sb_2O_3$, SnO, $BaCO_3$ and mixtures thereof. On account of their higher atomic number than $TiO_2$, these materials also have the advantage of avoiding or at least considerably reducing the disruptive direct incidence of X-rays on the photodiode.

The further optically reflecting material then leads to an increase in reflection irrespective of the reflectivity of $TiO_2$.

If the increase in reflection achieved by the abovementioned material is sufficiently high, this material can also be used as the only optically reflecting material.

The gas is in particular an inert gas or a mixture of inert gases, preferably nitrogen and/or carbon dioxide. It is preferably formed in situ by heating compounds such as for example $NH_4NO_2$, $(NH_4)_2CO_3$, $NaHCO_3$ in the reflector material. However, it can also be released through a chemical reaction.

For an optimum reflectance, the size of the gas bubbles is preferably in a range from approx. 0.5-1 μm or approximately 2-5 times the mean particle size of the reflecting particles. A homogeneous distribution of fine-grain gas-generating material can achieve a uniform distribution of extremely small gas bubbles in the polymer matrix, which likewise makes a contribution to increasing the reflectivity.

A further aspect of at least one embodiment of the invention relates to an X-ray detector having a detector material which converts X-rays into light, for example into visible light, and which is divided into a plurality of segments, wherein the individual segments of the detector material are separated by the reflector material according to at least one embodiment of the invention.

To form a two-dimensional area detector for imaging anatomical volumes, the segments of the X-ray detector are preferably arranged in matrix form in one surface. However, the detector material according to at least one embodiment of the invention can also advantageously be used to construct the one-dimensional linear detector modules that have hitherto been customary.

The X-ray detectors according to at least one embodiment of the invention can advantageously be used in a very wide range of X-ray devices.

At least one embodiment of the invention also relates to a process for producing a reflector material, which comprises the following steps:
a) dispersing a first optically reflecting material or a precursor thereof and a compound which can release a gas and/or a second optically reflecting material or a precursor thereof in a liquid polymer mixture,
b) homogeneously mixing the suspension which is formed,
c) if a precursor of an optically reflecting material is present, converting this precursor into the corresponding optically reflecting material, and/or if a compound which can release a gas is present, releasing the gas from this compound, and
d) curing the liquid polymer mixture simultaneously with or following step c).

The conversion of the precursors and/or the release of the gas may preferably be effected by heating or by chemical reaction.

The curing of the polymer mixture likewise may take place by heating for example, but may also, for example, be realized by irradiation or by other devices/methods.

The preferred optically reflecting materials and gases have already been described above.

The liquid polymer mixture particularly preferably consists of two components of an epoxy resin (Bisphenol A and hardener).

The heating or chemical reaction preferably take place in such a way that during the evolution of gas finely distributed gas bubbles are formed and distributed uniformly in the reflector material.

It is particularly advantageous for the gas and/or the reflector material to be formed in situ. If gas is used, a stable gas space that has been filled (at subatmospheric pressure) is formed during the curing. With a uniform filling level, the transfer of the light between polymer matrix/gas/filler leads to increased reflectivity and therefore also improves the light-proofness.

Furthermore, by admixing a light-reflecting material per se ($BaSO_4$) and/or a material ($Ba(C_2H_5)_2$ epoxy resin soluble, CaO solid, BaO) which takes up the gases which are formed, it is possible to produce a further light-reflecting substance and a subatmospheric pressure in the gas space (2 $BaO+CO_2+H_2O \rightarrow BaCO_3+Ba(OH)_2$). This subatmospheric pressure in the gas space or the gas bubble size can be controlled by applying an external subatmospheric pressure during the curing and/or by heating prior to the curing. In the process, the change in refractive index and the reflectivity are increased.

Furthermore, by applying the gas-generating substance in a thin film to the surface of the reflecting ($TiO_2$) particles and carrying out the gas evolution from this location, it is preferably also possible to produce reflecting ($TiO_2$) particles which are included in a gas bubble and are delaminated from the polymer matrix, thereby effecting a maximum increase in the change in refractive index ($TiO_2$/gas). This method also allows the use of less highly reflecting substances which, however, have a higher X-ray absorption.

On account of their solubility in epoxy resin, organometallic compounds are preferred for forming an optically reflecting material, because they do not effect any increase in viscosity when admixed. One example of a chemical reaction of this type in situ is as follows:

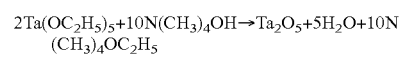
$$2Ta(OC_2H_5)_5 + 10N(CH_3)_4OH \rightarrow Ta_2O_5 + 5H_2O + 10N(CH_3)_4OC_2H_5$$

Finally, at least one embodiment of the present invention relates to a process for producing an X-ray detector, which comprises the following steps:
a) dividing a detector material into individual segments, so that the segments are arranged next to one another and gaps are present between the segments,
b) filling the gaps between the individual segments with the reflector material according to at least one embodiment of the invention, and
c) curing the reflector material.

A new and simplified process of this type, which involves filling a structured detector material with a highly optically reflective material in order to separate the individual detector channels, is for the first time possible by using the present invention.

This module can then be adhesively bonded in the customary way to a photodiode array using a transparent adhesive.

BRIEF DESCRIPTION OF THE DRAWINGS

In the text which follows, the invention is explained in more detail with reference to the accompanying figures and on the basis of example embodiments. In the drawings:

FIG. 2 shows a cross section through a layer of a reflector material according to at least one embodiment of the invention.

DETAILED DESCRIPTION OF THE EXAMPLE EMBODIMENTS

Figure 1:
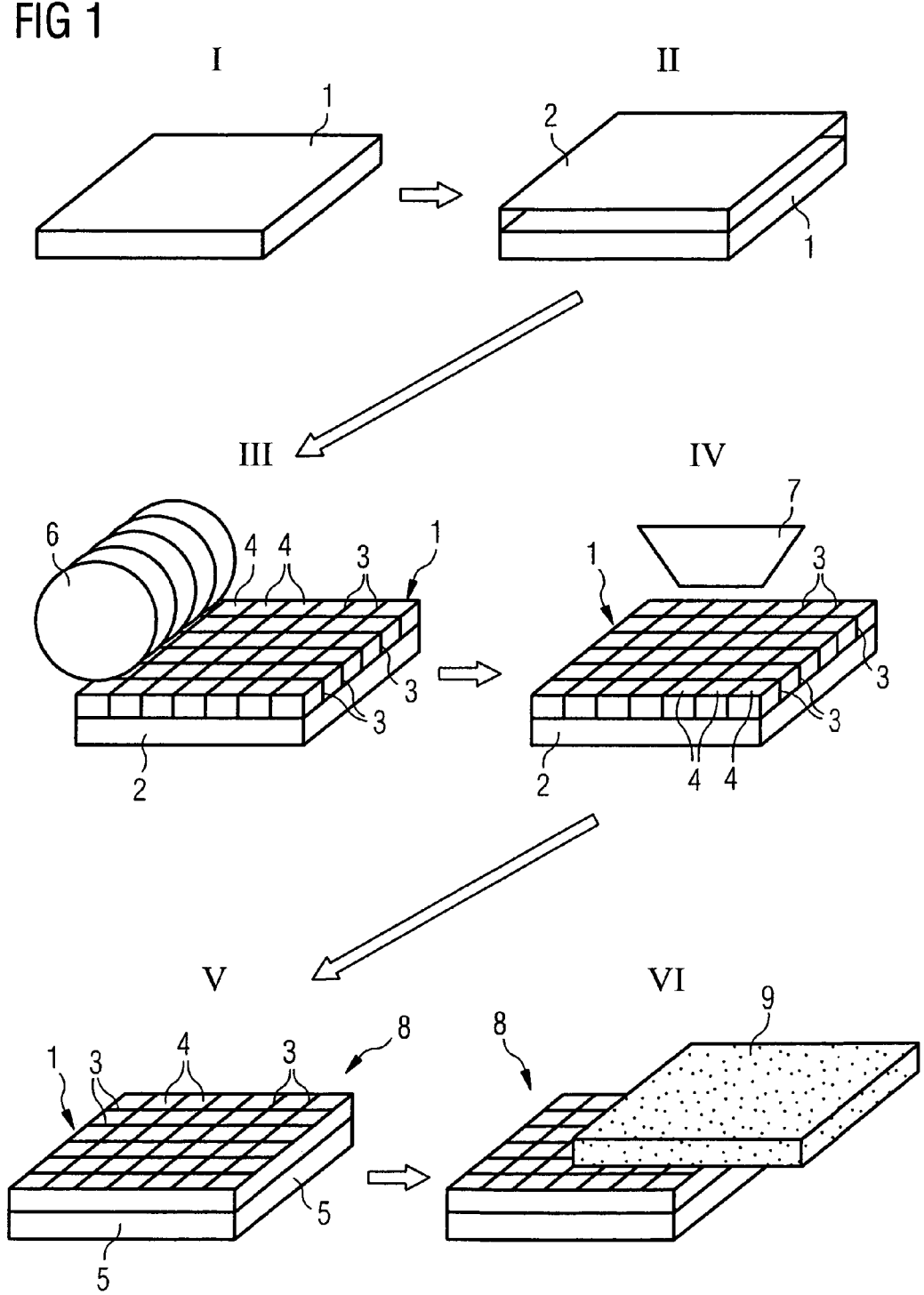
FIG. 1 shows a schematic diagram illustrating the production of a two-dimensional X-ray detector from UFC ceramic.

FIG. 1 diagrammatically depicts the production of a two-dimensional X-ray detector which can be used to display anatomical volumes in modern CT technologies.

First of all, a block of UFC ceramic is sawn into uniform wafers.

A UFC ceramic wafer 1 of this type is illustrated in step I. This wafer 1 is first of all covered with what is known as a covering reflector layer 2, which preferably consists of the same molding compound as that used to fill the detector segments. This covering reflector layer 2 will subsequently face in the direction of incoming X-ray quanta. Then, in step II, grooves 3 are sawn crossways into the UFC ceramic plate 1 from the rear side, i.e. from the side facing away from the covering reflector layer 2, with the aid of a suitable sawing device 6, so as to form a matrix-like structure with detector segments 4 arranged next to or above one another.

Working steps I to III can be carried out for a plurality of detector modules simultaneously by taking a relatively large ceramic wafer 1 and then dividing this structured wafer in order to obtain the individual detector modules.

Then, in step IV, the grooves 3 are filled with a liquid suspension of the reflector material using a suitable molding device 7, with the suspension then being cured.

In this context, it is ensured that a layer 5 of the reflector material is also formed at the outer edges of the UFC ceramic wafer 1.

Excess material on the surface of the ceramic is then ground off in step V, so that the opposite side of the structured UFC ceramic wafer 1 from the covering reflector layer 2 is free of reflecting material. This completes the actual detector module 8. This detector module 8, in the subsequent step VI, is then coupled to a photodiode module 9, in such a way that the detector segments 3 in each case rest against a photodiode element of a photodiode array of the photodiode module 9, in order that the photodiode element in question can record the light radiation generated in the detector segment 3 in question and convert it into electrical signals.

FIG. 2 shows a section through a boundary layer between a detector segment 10 and a septum 11. The reflector material in the septum 11 includes an epoxy resin 12 which includes gas bubbles 13 and an optically reflecting material 14, in this case TiO$_2$ particles 14. A subatmospheric pressure of between approx. 0.01 bar and approx. 0.9 bar is preferably present in the gas bubbles 13.

The bottom left-hand corner of FIG. 2 shows an enlarged illustration, which makes clear the optical transition between an air bubble 13 and a TiO$_2$ particle 14.

FIG. 2 also illustrates how light is generated from an X-ray quantum Rö within the detector segment 10, which light is then radiated in all directions with an intensity I$_0$. This light in part impinges laterally on the reflector material in the septum 11, and here in particular also impinges on the reflecting TiO$_2$ particles. The intensity component I$_R$ which is reflected back by the TiO$_2$ particles 14 is dependent not only on the refractive index n$_2$ of the TiO$_2$ particle 14 but also on the refractive index n$_1$ of the material from which the light ray impinges on the TiO$_2$ particle 14.

Thus, the overall optical transition has to be taken into consideration. In this context, the following relationship applies to the reflectance R, which represents the ratio of the intensity I$_R$ which is reflected back to the intensity I$_0$ impinging on it, $$R = \frac{I_R}{I_0} = \frac{(n_2 - n_1)^2}{(n_2 + n_1)^2}$$

At a refractive index n$_2$~3.1 for the TiO$_2$ particles 14 and a refractive index n$_1$~1 for the gas, on the one hand, and n$_1$~1.6 for epoxy resin, on the other hand, the overall result at a transition from the epoxy resin 12 to a TiO$_2$ particle 14 is a reflectance R~0.10, whereas at an optical transition from a gas bubble 13 to a TiO$_2$ particle 14 a reflectance of approximately R~0.26 is possible. This clearly demonstrates that the reflectance R can be considerably increased with the aid of the gas bubbles 13, in which context it should preferably be ensured that as many reflecting material particles 14 as possible are situated at the edge of the gas bubbles 13.

Finally, the following Example 1 describes one way of producing a reflector material according to at least one embodiment of the invention, to enhance understanding.

EXAMPLE 1

Production of a highly reflecting, X-ray absorbing molding material for complex UFC area detectors for computer tomography.

25 g of Ta$_2$O$_5$ are mixed with 0.01 to 10 g, preferably 0.1 to 1 g, of finely milled ammonium carbonate ((NH$_4$)$_2$CO$_3$) (particle size 0.05 to 2 μm, preferably 0.2-0.5 μm) and dispersed in the A component (Bisphenol A) of an epoxy resin. The suspension obtained has a shelf life of up to 12 weeks.

This is followed by homogeneous mixing with the appropriate quantity (calculated for the Bisphenol A content) of B component (hardener).

Then, the suspension which has been mixed with hardener and has a low viscosity at room temperature is worked in to build up the detector and conditioned for 2.5 hours at 40° C. In the process, the viscosity rises to approximately double its previous level. This is immediately followed by heating to 80° C. In the process, the ammonium carbonate which was added decomposes to form carbon dioxide and forms fine gas bubbles which are fixed in the hardening epoxy compound.

A particular advantage of this process is that a low-viscosity suspension is available for working into the fine structures of the detector. A further advantage is that first of all a suitable viscosity can be set by pre-hardening without the evolution of gas, with the result that during the subsequent evolution of gas very fine individual gas bubbles can be produced with a uniform distribution in the material.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A moldable and curing reflector material for an X-ray detector, comprising:
  a detector material, which converts X-rays into light, divided into a plurality of segments separated by the reflector material, the reflector material comprising a polymer matrix which includes an optically reflecting material and a finely distributed gas.

2. The reflector material as claimed in claim 1, wherein the polymer matrix is formed by a plastic resin.

3. The reflector material as claimed in claim 2, wherein the plastic resin comprises at least one of an epoxy resin and PMMA (polymethyl methacrylate).

4. An X-ray detector comprising:
  a detector material, which converts X-rays into light, divided into a plurality of individual segments, the individual segments of the detector material being separated by the reflector material as claimed in claim 2.

5. The reflector material as claimed in claim 1, wherein the optically reflecting material is selected from the group consisting of $TiO_2$, $BaSO_4$, $WO_3$, $Gd_2O_3$, $Ta_2O_5$, $La_2O_3$, $SnO$, $Sb_2O_3$, $BaCO_3$ and mixtures thereof.

6. The reflector material as claimed in claim 1, wherein the optically reflecting material comprises $TiO_2$.

7. The reflector material as claimed in claim 6, wherein the optically reflecting material also comprises at least one of $WO_3$, $Gd_2O_3$, $Sb_2O_3$, $BaSO_4$, $Ta_2O_5$, $La_2O_3$, $SnO$, $BaCO_3$ and a mixture thereof.

8. The reflector material as claimed in claim 1, wherein the gas is at least one of an inert gas and a mixture of inert gases.

9. The reflector material as claimed in claim 1, wherein the size of the gas bubbles is in a range from 0.5-1 μm.

10. An X-ray detector comprising:
  a detector material, which converts X-rays into light, divided into a plurality of individual segments, the individual segments of the detector material being separated by the reflector material as claimed in claim 1.

11. The X-ray detector as claimed in claim 10, wherein the segments lie in one surface.

12. An X-ray device comprising the X-ray detector as claimed in claim 11.

13. An X-ray device comprising the X-ray detector as claimed in claim 10.

14. A process for producing an X-ray detector, comprising:
  a) dividing a detector material into individual segments, so that the segments are arranged next to one another and gaps are present between the segments;
  b) filling the gaps between the individual segments with the reflector material as claimed in claim 1; and
  c) curing the reflector material.

15. The reflector material as claimed in claim 1, wherein the gas is at least one of nitrogen and carbon dioxide.

16. A process for producing a reflector material, comprising:
  a) dispersing at least one of an optically reflecting material and a precursor thereof, and a compound capable of releasing a gas in a liquid polymer mixture;
  b) homogeneously mixing a suspension which is formed;
  c) if a precursor of an optically reflecting material is present, converting the precursor into the corresponding optically reflecting material and releasing the gas from the compound capable of releasing a gas; and
  d) curing the liquid polymer mixture simultaneously with or following step c).

17. The process as claimed in claim 16, wherein the liquid polymer mixture consists of two components of at least one of an epoxy resin and PMMA (polymethyl methacrylate).

18. The process as claimed in claim 16, wherein at least one of the gas and the optically reflecting material are formed by at least one of heating and by chemical reaction.

19. The process as claimed in claim 16, wherein at least one of the gas and the optically reflecting material are formed in situ.

20. The process as claimed in claim 16, wherein the gas bubble size is controlled by applying an external subatmospheric pressure during at least one of the curing and heating prior to the curing.

* * * * *